United States Patent
Pajona et al.

(10) Patent No.: US 9,462,488 B2
(45) Date of Patent: *Oct. 4, 2016

(54) SYSTEM AND METHOD FOR OPTIMIZING SIGNAL QUALITY IN A WIFI NETWORK

(71) Applicant: Ethertronics, Inc., San Diego, CA (US)

(72) Inventors: Olivier Pajona, Nice (FR); Sebastian Rowson, San Diego, CA (US); Laurent Desclos, San Diego, CA (US)

(73) Assignee: ETHERTRONICS, INC., San Diego, CA (US)

( * ) Notice: Subject to any disclaimer, the term of this patent is extended or adjusted under 35 U.S.C. 154(b) by 127 days.

This patent is subject to a terminal disclaimer.

(21) Appl. No.: 14/313,256

(22) Filed: Jun. 24, 2014

(65) Prior Publication Data

US 2014/0376534 A1     Dec. 25, 2014

Related U.S. Application Data

(60) Provisional application No. 61/838,582, filed on Jun. 24, 2013.

(51) Int. Cl.
| | |
|---|---|
| *H04W 4/00* | (2009.01) |
| *H04W 24/02* | (2009.01) |
| *H04W 84/12* | (2009.01) |

(52) U.S. Cl.
CPC ............. *H04W 24/02* (2013.01); *H04W 84/12* (2013.01)

(58) Field of Classification Search
CPC .. H04W 24/02; H04W 84/12; H04B 7/0413; H01Q 1/243; H01Q 3/44; H01Q 19/28
USPC ............................. 370/310.2, 316, 338, 339
See application file for complete search history.

(56) References Cited

U.S. PATENT DOCUMENTS

| | | | |
|---|---|---|---|
| 2008/0002733 A1* | 1/2008 | Sutskover | H04L 5/0023 370/436 |
| 2010/0091745 A1* | 4/2010 | Bevan | H04W 24/02 370/338 |
| 2010/0234071 A1* | 9/2010 | Shabtay | H04B 7/0408 455/562.1 |

* cited by examiner

*Primary Examiner* — Phuc Tran
(74) *Attorney, Agent, or Firm* — Coastal Patent Law Group, P.C.

(57) ABSTRACT

A system and method are provided for a WiFi network including multiple access points, each access point including an antenna having a plurality of modes corresponding to a plurality of radiation patterns, respectively, or an antenna system including a plurality of antennas having a plurality of modes corresponding to a plurality of radiation patterns, respectively, and a processor implemented with an algorithm. The algorithm is a computer program having instructions for performing steps to optimize signal quality for multiple devices linked to the WiFi network.

12 Claims, 4 Drawing Sheets

---

Obtain EDL-CQI for each device, $(EDL\text{-}CQI)_1$, $(EDL\text{-}CQI)_2$ ... and $(EDL\text{-}CQI)_M$, with AP having its modal antenna configured in one mode $i$ at time n.    404

Obtain $CellQI_i(n)$ for the mode $i$ based on $(EDL\text{-}CQI)_1$, $(EDL\text{-}CQI)_2$ ... and $(EDL\text{-}CQI)_M$.    408

Examine by using the MCD if any mode $j$ has predicted CellQI higher than predicted CellQI of current mode $i$; if so, switch to the mode $j$; otherwise, stay on the same mode $i$.    412 n = n+1    A device having a weak signal from the present AP switches to another AP; or vice versa.    416

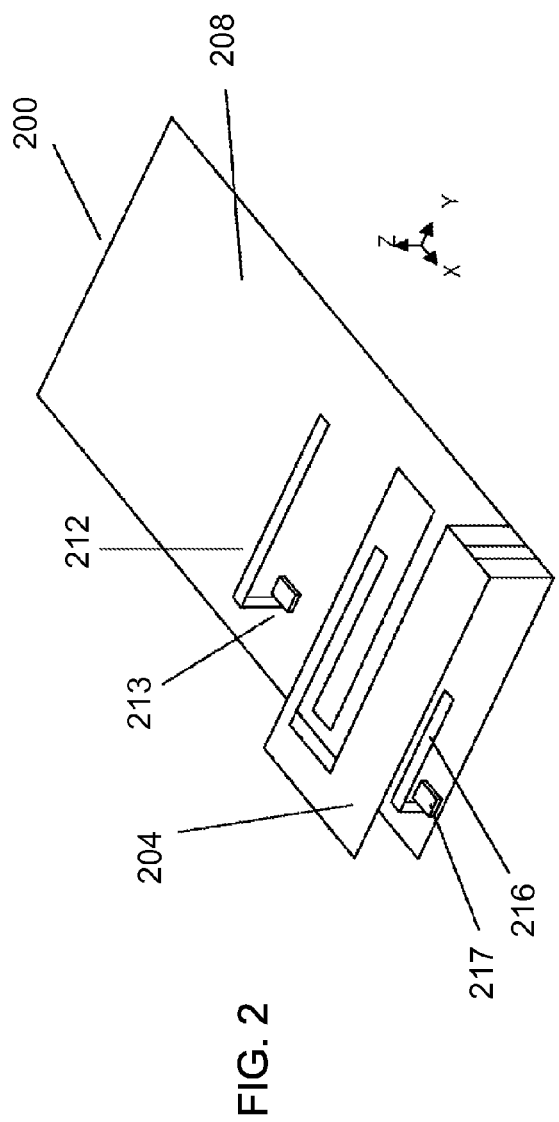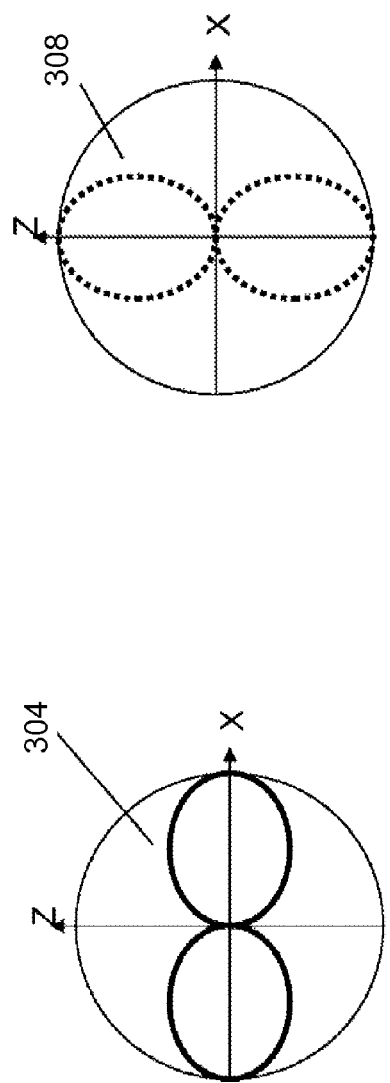

SYSTEM AND METHOD FOR OPTIMIZING SIGNAL QUALITY IN A WIFI NETWORK

CROSS-REFERENCE TO RELATED APPLICATIONS

This application claims benefit of priority with U.S. Provisional Ser. No. 61/838,582, filed Jun. 24, 2013; the contents of which are hereby incorporated by reference.

BACKGROUND OF THE INVENTION

1. Field of the Invention

This invention relates to wireless communication systems and methods; and more particularly, to a system and related method of optimizing signal quality for a plurality of devices linked to a WiFi network.

2. Description of the Related Art

Mobile devices such as laptops, tablets, personal digital assistants, cellular phones and smart phones, as well as fixed devices such as desktops, workstations, printers, etc., can be connected to wireless local area network (WLAN) links through an access point such as a router. Modern WLANs are adapted to operate in accordance with the IEEE 802.11 standards for communication in the 2.4, 3.6 and 5 GHz frequency bands. WiFi is defined as WLAN products that are based on the IEEE 802.11 standards. The term WiFi is often used as a synonym for WLAN. Implementations of WLANs range from small in-home or in-office networks to large campus-sized or airport-sized networks, and have become popular due to ease of installation and low cost or often free access. However, WiFi networks generally have a limited range. For example, an access point using IEEE 802.11b or 802.11g may have a range of approximately 120 ft indoors. The range varies with frequency band. For example, WiFi in the 2.4 GHz band has a slightly wider range than WiFi in the 5 GHz band which is used by 802.11a and optionally by 802.11n. Therefore, the WiFi coverage over a large area requires a group of access points with overlapping ranges.

WLAN internal roaming involves a situation wherein a wireless device moves the connection from one access point to another within a WiFi network because the signal strength from the original access point gets too weak. The wireless device may include an algorithm to periodically monitor the presence of alternative access points, which may provide a better connection, and to re-associate itself with an access point having a stronger signal. However, due to the complex nature of radio propagation, it is difficult to predict WiFi signal strength for a given area in relation to a transmitter. In many instances, the line of sight between a transmitter and a receiver involved in the communication becomes blocked or shadowed with obstacles such as walls, trees and other objects. Each signal bounce may introduce phase shifts, time delays, attenuations and distortions, which ultimately interfere at the receiving antenna. Destructive interference in the wireless link is problematic and results in degradation of device performance. A signal quality metric is often used to assess the quality of signals. Examples of such quality metrics include signal-to-noise ratio (SNR), signal to interference-plus-noise ratio (SINR), receive signal strength indicator (RSSI), bit error rate (BER) and various other metrics, which are called channel quality indicators (CQI).

Increasing the number of access points in a WiFi network generally provides network redundancy and support for fast roaming by defining smaller cells. However, WiFi connections may be disrupted and/or internet speed may be lowered due to interference by having too many devices in the same area connected to one access point. A wireless device typically has one antenna with one mode (i.e., one radiation pattern), and the access point connected to the device is not capable of modifying the radiation pattern of the antenna of the device. This situation leads to a sub-optimal traffic, wherein one access point may be overloaded while another is underloaded. Therefore, quality of service (QOS) offered to the users is not optimized in this scenario.

BRIEF DESCRIPTION OF THE DRAWINGS

FIG. 2 illustrates an example of a modal antenna.

FIG. 3($a$) illustrates a radiation pattern associated with the modal antenna in the first state; and FIG. 3($b$) illustrates a radiation pattern in the second state.

DETAILED DESCRIPTION

Figure 1:
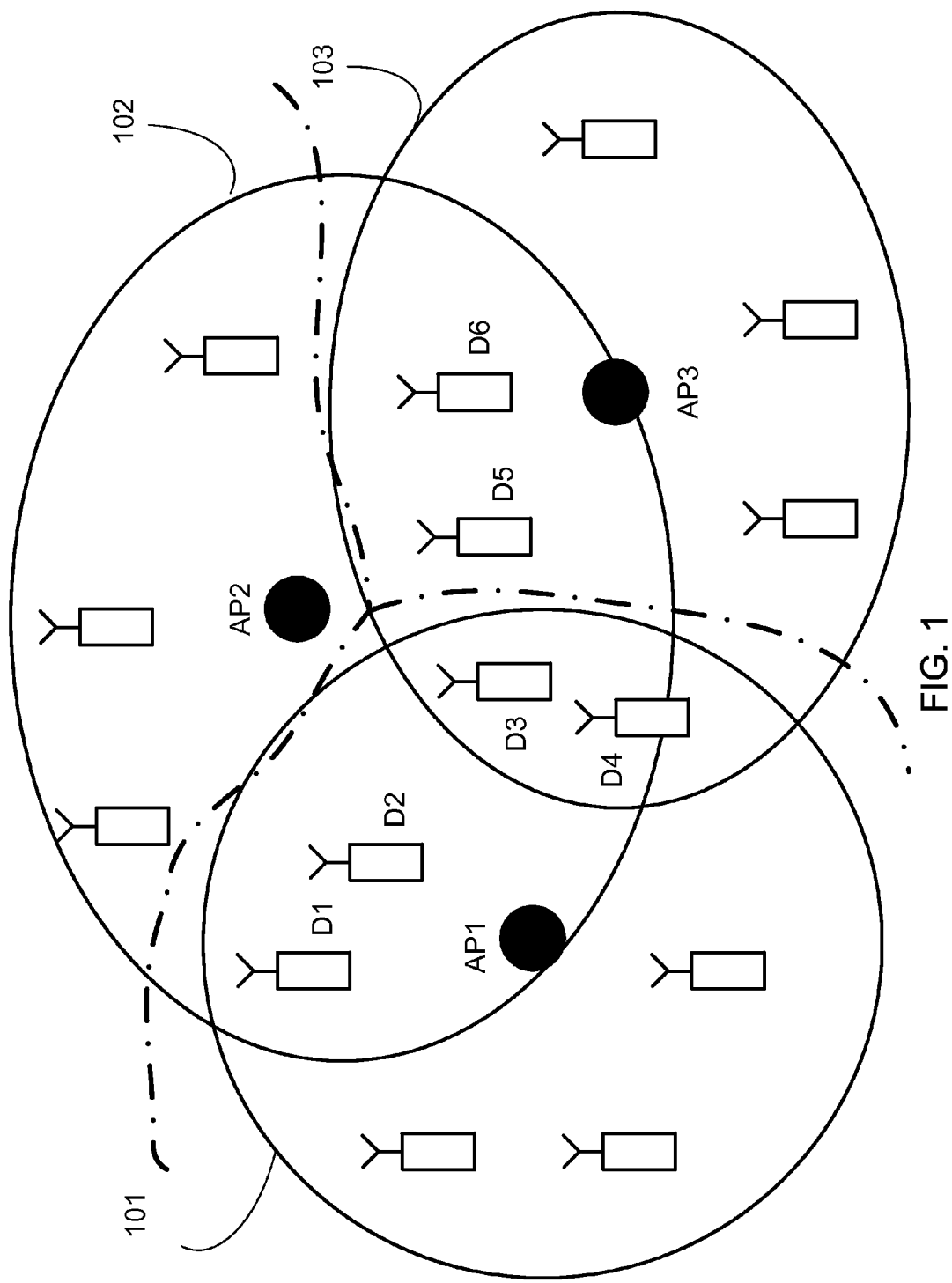
FIG. 1 illustrates an example of distribution of coverage ranges associated with access points and locations of wireless devices.

FIG. 1 illustrates an example of distribution of coverage ranges associated with access points and locations of wireless devices. This area may represent a home, an office, a hotel, an airport, a university or other places where a WiFi network is available. In this example, the devices are assumed to be in the area where WiFi links are implemented with three access points, labeled AP1, AP2 and AP3, having respective coverage ranges 101, 102 and 103. Each range is schematically illustrated by a circle or an oval having a certain signal level in terms of strength and quality. The shape and size of a coverage range may vary as the signal fades or amplifies due to interference, absorption, distortion and various other factors caused by diffracting, shadowing or blocking of signal paths by obstacles and/or weather conditions. In some instances, interferences may be caused by the way the user places his head or hand near the handset. Occasionally, one or more of the coverage ranges may not be available due to system or device malfunctions in the network. The coverage range of an access point is also referred to as a cell in this document.

In the example of FIG. 1, mobile devices such as laptops, tablets, personal digital assistants, cellular phones and smart phones and/or fixed devices such as desktops, workstations, printers, etc. are linked to the WiFi network through the access points AP1, AP2 and AP3. Each of these devices is represented by a rectangle box having an antenna in this figure. Conventional antennas are used for the access points and wireless devices in this example. The devices D1 and D2 are located in the overlap region of the coverage ranges of AP1 and AP2; the devices D3 and D4 are located in the overlap region of the coverage ranges of AP1, AP2 and AP3; and the devices D5 and D6 are located in the overlap region of the coverage ranges of AP2 and AP3. Due to the signal strength and quality that the antennas detect, the devices D1, D2, D3 and D4 are linked to the access point AP1; and the devices D5 and D6 are linked to the access point AP3, where the boundary is illustrated by dash-dot lines in this figure. As a result, the access point AP1 is loaded with 7 devices; the access point AP2 is loaded with 3 devices; and the access point AP3 is loaded with 5 devices, giving rise to unbalanced load sharing among the three access points. A wireless device typically has one antenna with one mode (i.e., one radiation pattern). Even if the device is equipped with an antenna or antenna system capable of changing the radiation pattern, the access point generally is not configured to command the device to modify the radiation pattern of the antenna of the device to switch to another access point. This situation leads to a sub-optimal traffic, wherein one access point is overloaded while another is underloaded, and thus the quality and strength of signals are not optimized for the devices in use in the WiFi network.

In view of the above problems related to degradation of signal quality caused by unbalanced load sharing among access points, this document describes a system and method for optimizing signal quality for the devices linked to the WiFi network, by dynamically changing the radiation pattern, i.e., gain or directivity, of an antenna associated with the access point.

Such an active antenna system may be configured to include a modal antenna that can be actively controlled for different beam steering directions. A modal antenna, also referred to as a null-steering antenna, can generate multiple modes corresponding to multiple radiation patterns, equivalent to having a set of antennas with the same feed. By using the modal antenna capable of generating different radiation patterns, it is possible to exploit a priori knowledge of antenna nulls and lobes in the different modes for steering the beam to have nulls in dominant interference directions while keeping gain in desired directions. Examples of structures and implementations of the modal antennas are provided in U.S. Pat. No. 7,911,402, entitled "ANTENNA AND METHOD FOR STEERING ANTENNA BEAM DIRECTION," issued on Mar. 22, 2011. The contents of the above patent are incorporated herein by reference and are summarized as follows.

FIG. 2 illustrates an example of a modal antenna 200, which includes an Isolated Magnetic Dipole™ (IMD) element 204 placed on a ground plane 208, a first parasitic element 212 coupled to an first active element 213, and a second parasitic element 216 coupled to a second active element 217. The active elements 213 and 217 may include switches that either electrically connect (short) or disconnect (open) the parasitic elements 212 and 216 to the ground plane 208. This structure allows for two different modes of operation with a common frequency corresponding to a first state where the parasitic elements 212 and 216 are shorted to the ground and a second state where the parasitic elements 212 and 216 are open. FIG. 3(a) illustrates a radiation pattern 304 associated with the modal antenna 200 in the first state; and FIG. 3(b) illustrates a radiation pattern 308 in the second state, which shows a ninety-degree shift in direction as compared to the radiation pattern 304. Thus, by controlling the active elements 213 and 217 of the modal antenna 200, the operation of two modes can be obtained at the same frequency. The control scheme can be extended for multi-mode operations by incorporating, for example, tunable elements in the active elements for variable control and additional active elements for impedance matching. Examples of these active elements include switches, tunable capacitors, tunable phase shifters, diodes, micro-electro-mechanical system (MEMS) switches, MEMS tunable capacitors, and transistors including a metal oxide semiconductor field effect transistor (MOSFET), a metal semiconductor field effect transistor (MESFET), a pseudomorphic high electron mobility transistor (pHEMT), a heterojunction bipolar transistor (HBT) or of other suitable technologies.

Upon using a modal antenna, the procedure to select an optimal mode may be required for signal transmission and/or receiving. The procedure needs to be carried out dynamically since the use conditions, movement of the handset, incoming signal properties, access point conditions and various other conditions and surroundings vary with time. A method to dynamically find an optimal mode among multiple modes of a modal antenna has been described in the U.S. patent application Ser. No. 13/707,506, entitled "MODAL COGNITIVE DIVERSITY FOR MOBILE COMMUNICATION," filed on Dec. 6, 2012, and U.S. patent application Ser. No. 13/749,627, entitled "MODAL COGNITIVE DIVERSITY FOR MOBILE COMMUNICATION MIMO SYSTEMS," filed on Jan. 24, 2013. The method is termed "modal cognitive diversity (MCD)" therein. The contents of the above patent applications are hereby incorporated by reference, and the MCD scheme is summarized as follows.

A linear predictor based on a normalized-least-mean-square (NLMS) adaptive filter can be used to derive future CQI estimates in the MCD algorithm. In this algorithm, the vector W(n) represents the filter tap weight vector (coefficients of filter) and the vector X(n) represents the filter input vector (CQI values) at time n as follows:

$$W(n) = [W_1(n), W_2(n), \ldots, W_M(n)]^T$$

$$X(n) = [CQI(n-1), CQI(n-2), \ldots, CQI(n-M)]^T.$$

Here $(.)^T$ represents the transpose operator, and M represents the filter length. The NLMS adaptation equation gives the coefficients of filter at time n+1 as follows:

$$W(n+1) = W(n) + \mu \frac{X(n)e(n)}{X(n) \cdot X^H(n)}. \qquad \text{Eq. (1)}$$

Here $\mu$ is the step size parameter, e(n) is the CQI prediction error, and $(.)^H$ represents the Hermitian transpose. The future value of CQI, $\overline{CQI}(n+1)$, can be predicted at time n as:

$$\overline{CQI}(n+1) = X(n+1) \cdot W^H(n+1), \qquad \text{Eq. (2)}$$

where $$X(n+1) = [CQI(n), CQI(n-1), \ldots, CQI(n+1-M)]^T. \qquad \text{Eq. (3)}$$

Thus, the above equation Eq. (2) for $\overline{CQI}(n+1)$ indicates that the CQI value at time n+1 can be predicted based on the coefficients of filter W(n) that depends on the quantities during the filter length M up until time n as shown in Eq. (1) and the CQI values during the filter length M up until time n as shown in Eq. (3).

Pilot signals can be used to measure and calculate CQIs in the CQI prediction algorithm. In cellular and personal communication services (PCS) systems based on code division multiple access (CDMA), for example, a pilot signal is used for synchronization, coherent detection, soft handoff, maintaining orthogonally between base stations and so on. A pilot signal is a carrier modulated by a high chip rate pulse-shaped pseudo noise (PN) sequence and is transmitted on the forward link (from a base station to a mobile unit). All mobile units are designed to have the prior knowledge of the periodic PN sequence.

In the MCD scheme, the CQI prediction algorithm is carried out for each mode of one modal antenna at each time step to determine the expected (predicted) CQI for each mode j, $\overline{CQI}_j(n+1)$. Specifically, the filter input vector X(n) contains CQI values which are either previous measurements CQIi(n−k) (when the mode j corresponding to the filter j was selected), or previous predicted CQI values for this mode $\overline{CQI}j(n-k)$ (when the mode j corresponding to the filter j is currently selected). It can also contain a combination of CQIi(n−k) and $\overline{CQI}j(n-k)$ during transition phases which occur when the decision is made to switch from one mode to another mode.

In the present MCD algorithm, at a given time step n, the instantaneous CQI for the currently selected i-th mode, CQIi(n), is measured and the predicted CQI for the i-th mode $\overline{CQI}i(n+1)$ is computed and compared to the predicted CQI for the j-th mode, $\overline{CQI}j(n+1)$. The mode switches to the j-th mode if:

$$\overline{CQI}_i(n+1) < \overline{CQI}_j(n+1) - \Delta,$$  Eq. (4)

where Δ is a predetermined threshold and i≠j. The threshold may be predetermined such that the switch from one mode to another gives a meaningful, good enough CQI improvement. Otherwise, the mode stays the same.

The present system and method consider a WiFi network having multiple access points, each of which is configured to have an antenna capable of generating multiple radiation patterns or an antenna system including multiple antennas capable of generating multiple radiation patterns. The multiple radiation patterns correspond to multiple modes, respectively, of the antenna or the antenna system. All the antennas in the WiFi network may be configured to be conventional antennas, or at least one of them may be configured to be the modal antenna explained earlier. In the embodiments described below, each access point is configured to have the modal antenna for generating multiple radiation patterns; however, it should be understood that the present system and method can be adapted for the cases wherein each access point has a conventional antenna capable of generating multiple radiation patterns or an antenna system having multiple antennas that also can generate multiple radiation patterns.

According to a first embodiment, the mode of the modal antenna of each access point is selected during each time interval based on the MCD scheme to dynamically change the radiation pattern, i.e., gain or directivity, to optimize the signal quality for the devices linked to the WiFi network. In this embodiment, the MCD algorithm may be implemented in a processor associated with each access point to obtain the mode of the modal antenna that optimizes the signal quality for the devices in the cell. Therefore, the optimization in this case is individually performed for the cells covered by the multiple access points. According to a second embodiment, an algorithm may be implemented in a processor associated with each access point, wherein the algorithm enables the access points to communicate with each other to find out a combination of modes of the modal antennas that optimizes the signal quality for the devices linked to the WiFi network. The algorithm in the first or the second embodiment may be implemented in a processor of each access point as a computer program comprising instructions for performing various tasks and operations as explained below with references to FIGS. 4 and 5.

Figure 4:
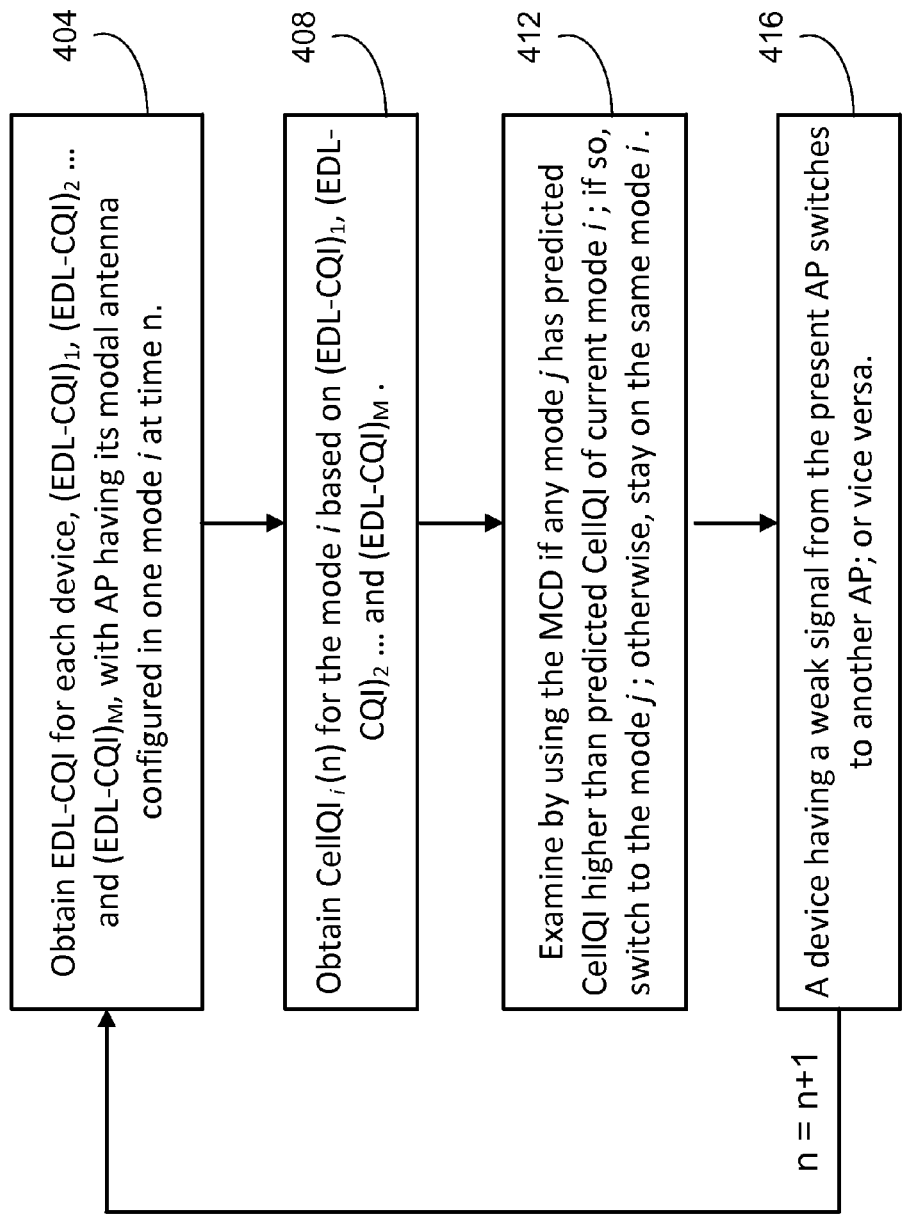
FIG. 4 is a flowchart illustrating a process for optimizing the signal quality for the devices in a cell covered by one access point, according to the first embodiment.

FIG. 4 is a flowchart illustrating a process for optimizing the signal quality for the devices in a cell covered by one access point, according to the first embodiment. Each of the access points of the WiFi network is configured to be implemented with the MCD software for the individual signal optimization, and the process illustrated in FIG. 4 represents one of them in the WiFi network. In the example of FIG. 4, the access point is configured to have a modal antenna designed to have N different modes, i.e., N different radiation patterns. First, a metric termed estimated downlink channel quality indicator (EDL-CQI) is defined for each device in the cell to characterize the signal quality in the uplink. The EDL-CQI is generated by taking into account the following properties associated with the link between the access point and each device: SNR that the access point can detect in the uplink (UL-SNR), and the modulation scheme in the downlink (DL-mod). The quality of signals in the downlink is generally unknown by the access point, since no downlink CQI is reported back by the device to the access point. However, the UL-SNR is detectable by the access point. Additionally, the DL-mod and associated data rates are detectable, for example, by trial and error by sending a packet using a modulation scheme and receiving/not receiving an acknowledgement feedback at the access point from the device. In general, a modulation scheme (QPSK, QAM16, QAM64, QAM256, . . . ) is selected depending on SNR. If the DL-SNR is low, a modulation scheme with low data rates is used in the downlink. Thus, the DL-mod correlates to the DL-SNR and can be utilized to generate the EDL-CQI together with the UL-SNR information. Second, a metric termed cell quality indicator, CellQI, is defined to characterize the signal quality over the cell. Assuming that there are M devices in the cell covered by the mode i ($1 \le i \le N$), the CellQI for the mode i may be generated by taking the average of all EDL-CQIs in the cell, a minimum of all EDL-CQIs in the cell, or other quantity based on the EDL-CQIs obtained respectively for the M devices in the cell when the modal antenna of the access point is configured in the mode i.

In step 404 of FIG. 4, the access point (AP) has the modal antenna configured in one mode i at time n, where $1 \le i \le N$, and the EDL-CQI is obtained for each device, $(EDL-CQI)_1$, $(EDL-CQI)_2$, . . . and $(EDL-CQI)_M$, where M is the number of devices in the cell covered by the mode i at time n. In step 408, the $CellQI_i(n)$ for the mode i at time n is obtained based on the $(EDL-CQI)_1$, $(EDL-CQI)_2$, . . . and $(EDL-CQI)_M$. In this process, the MCD algorithm described earlier can be used by replacing CQI with CellQI. In step 412, by using the MCD algorithm, it is examined if any other mode j has a predicted CellQI higher than a predicted CellQI of the current mode i. If so, the mode switches to j; otherwise, the mode stays the same, as shown in Eq. (4). This procedure determines one mode that provides the best CellQI at time n, and the modal antenna is configured to stay in the mode during the time interval. At this step, the signal quality for the devices in the cell covered by the selected mode of the modal antenna of each access point has been optimized. To fine-tune the optimization, some of the devices may optionally be allowed to switch their links to other access points. In the present system and method, it is assumed that each device has capability to switch to another access point if the signal from the original access point deteriorates. For example, the device may be configured to have a modal antenna or multiple antennas having multiple modes, i.e., radiation patterns, and an associated algorithm to be able to change the radiation pattern to switch the link from one access point to another depending on the signal quality and strength. Once the mode of the modal antenna of each access point is selected in step 412 as above, there may be one or more devices which now receive weak signals from the access point or gets outside of the cell corresponding to the coverage by the previous mode. Each of such devices may switch to another access point in step 416 by using the capability implemented in the device. Similarly, the devices in nearby access points with weak signals may switch to the present access point in step 416. In the next time n+1, the process goes back to step 404, where the EDL-CQI is obtained for each device, $(EDL\text{-}CQI)_1$, $(EDL\text{-}CQI)_2$, ... and $(EDL\text{-}CQI)_M$, where M is the number of devices in the cell covered by the mode j at time n+1, and M may be the same as or different from the number of device in the cell covered by the previous mode i. The devices that joined the cell and/or the devices that left the cell in step 416 can be taken into consideration in this step 404 by re-acquiring new EDL-CQIs at time n+1 for the new set of devices in the cell. This process repeats at sequential time steps by running the MCD algorithm in order to configure the modal antenna of each access point in one mode that optimizes the signal quality over the cell during each time interval.

Figure 5:
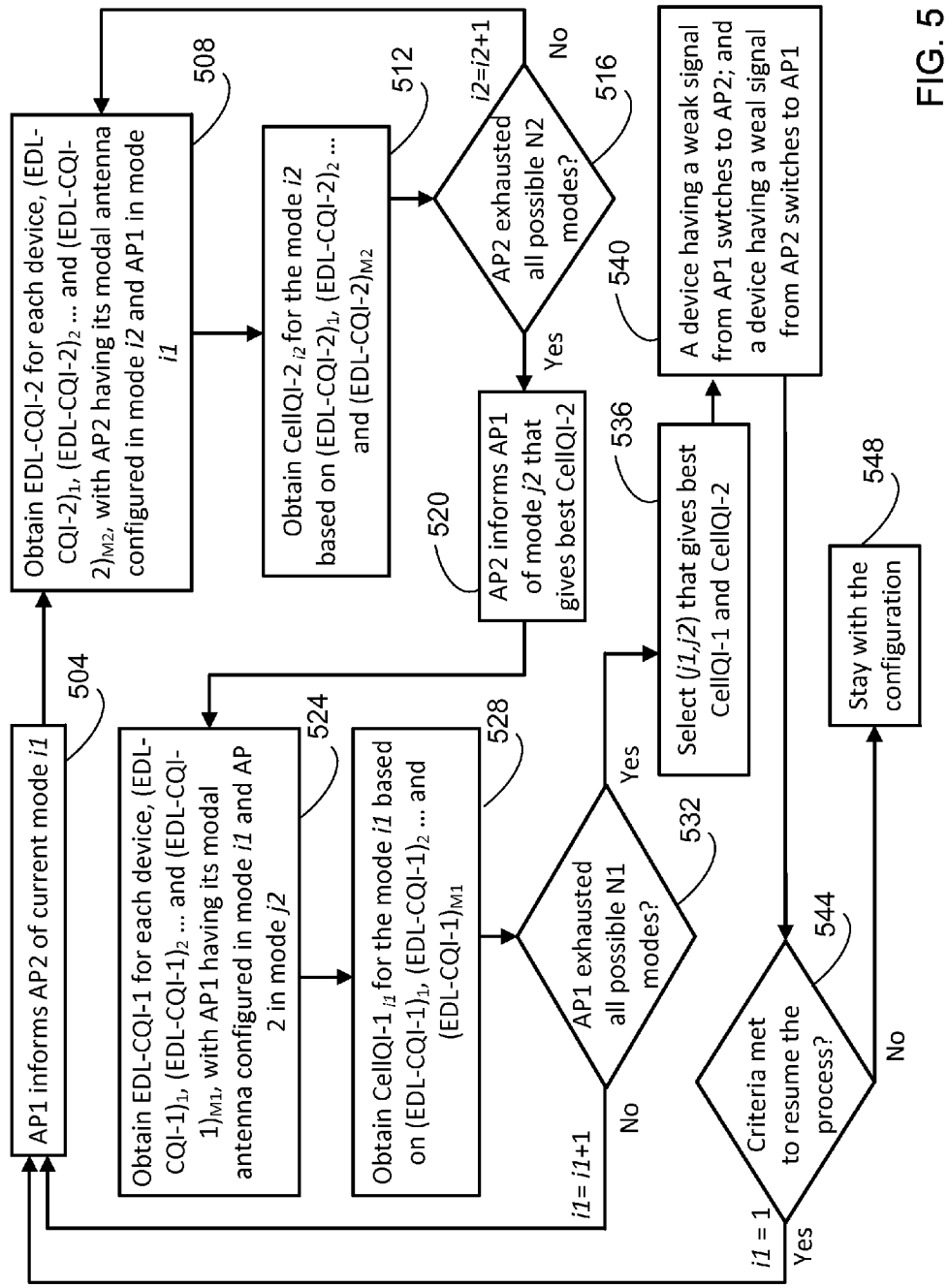
FIG. 5 is a flowchart illustrating a process for optimizing the signal quality for the devices in cells covered by two access points, according to the second embodiment.

FIG. 5 is a flowchart illustrating a process for optimizing the signal quality for the devices in cells covered by two access points, according to the second embodiment. As is obvious to those skilled in the art, this process involving two access points can be extended to the case with three or more access points. These access points, AP1 and AP2, are configured to have respective modal antennas and communicate with each other. The AP1 has a modal antenna with N1 different modes, and the AP2 has a modal antenna with N2 different modes. In step 504, the AP1 informs the AP2 of the current mode i1 of the modal antenna of the AP1, where $1 \leq i1 \leq N1$. In step 508, the estimated downlink CQI metric associated with the AP2, labeled EDL-CQI-2, is obtained for each device, $(EDL\text{-}CQI\text{-}2)_1$, $(EDL\text{-}CQI\text{-}2)_2$, ... and $(EDL\text{-}CQI\text{-}2)_{M2}$, where M2 is the number of devices in the cell covered by the mode i2 of the modal antenna of the AP2 while the AP1 is in the mode i1. In step 512, the cell quality indicator associated with the AP2, labeled $CellQI\text{-}2_{i2}$, is defined to characterize the signal quality over the cell covered by the mode i2, where $1 \leq i2 \leq N2$. The $CellQI\text{-}2_{i2}$ is obtained based on $(EDL\text{-}CQI\text{-}2)_1$, $(EDL\text{-}CQI\text{-}2)_2$, ... and $(EDL\text{-}CQI\text{-}2)_{M2}$, by taking the average, the minimum or other quantity based on these estimated downlink CQIs associated with the AP2 for the mode i2. The above process represented by steps 508 and 512 is repeated for each mode i2 until all possible N2 modes are exhausted at step 516. Accordingly, the mode j2 that provides the best cell quality indicator associated with the AP2 is selected, and the AP2 informs the AP1 of the selected mode j2 in step 520. In step 524, the estimated downlink CQI metric associated with the AP1, labeled EDL-CQI-1, is obtained for each device, $(EDL\text{-}CQI\text{-}1)_1$, $(EDL\text{-}CQI\text{-}1)_2$, ... and $(EDL\text{-}CQI\text{-}1)_{M1}$, where M1 is the number of devices in the cell covered by the mode i1 of the modal antenna of the AP1 while the AP2 is in the selected mode j2. In step 528, the cell quality indicator associated with the AP1, labeled $CellQI\text{-}1_{i1}$, is defined to characterize the signal quality over the cell covered by the mode i1, where $1 \leq i1 \leq N1$. The $CellQI\text{-}1_{i1}$ is obtained based on $(EDL\text{-}CQI\text{-}1)_1$, $(EDL\text{-}CQI\text{-}1)_2$, ... and $(EDL\text{-}CQI\text{-}1)_{M1}$, by taking the average, the minimum or other quantity based on these estimated downlink CQIs associated with the AP1 for the mode i1. The above process represented by steps 524 and 528 is repeated for each mode i1 until all possible N1 modes are exhausted at step 532. The interactive process for the AP1 and AP2 as above selects the mode j1 of the AP1 and the mode j2 of the AP2 that optimize the signal quality over the cells associated with the AP1 and AP2. To fine-tune the optimization, some of the devices may optionally be allowed to switch their links to other access points. In the present system and method, it is assumed that each device has capability to switch to another access point if the signal from the original access point deteriorates. For example, the device may be configured to have a modal antenna or multiple antennas having multiple modes, i.e., radiation patterns, and an associated algorithm to be able to change the radiation pattern to switch from one access point to another depending on the signal quality and strength. Once the combination of modes of the modal antennas of the AP1 and AP2 is selected in step 536 as above, there may be one or more devices which now receive weak signals from the original access point or gets outside of the cell corresponding to the coverage by the previous mode. Each of such devices originally linked to the AP1 may switch to the AP2 in step 540, and vice versa by using capability implemented in the devices. The configuration having new links of the devices to the AP1 and AP2 may stay as in step 548 until a certain criteria is met to warrant resuming the process in step 544 to find another combination of modes j1 and j2 that provides optimal signal quality. The criteria may be set such that an overall cell quality indicator, for example, $CellQI\text{-}1_{j1} + CellQI\text{-}2_{j2}$, deteriorates below a certain threshold.

While this document contains many specifics, these should not be construed as limitations on the scope of an invention or of what may be claimed, but rather as descriptions of features specific to particular embodiments of the invention. Certain features that are described in this document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be exercised from the combination, and the claimed combination may be directed to a subcombination or a variation of a subcombination.

What is claimed is:

1. A communication system for a WiFi network comprising:
    a plurality of access points, each access point including an antenna having a plurality of modes corresponding to a plurality of radiation patterns, respectively, or an antenna system including a plurality of antennas having a plurality of modes corresponding to a plurality of radiation patterns, respectively, and a processor including an algorithm;
    wherein the algorithm is implemented as a computer program comprising instructions for performing steps to optimize signal quality for a plurality of devices linked to the WiFi network; and
    wherein the algorithm comprises a modal cognitive diversity (MCD) algorithm, the MCD algorithm being configured to obtain a mode of the antenna or the antenna system of each access point, the mode providing optimal signal quality for a plurality of devices in a cell covered by the mode of the antenna or the antenna system of the access point during each time interval.

2. The communication system of claim 1, wherein
    the algorithm is configured to enable the plurality of access points to communicate with each other to select a combination of modes that provides optimal signal quality for the plurality of devices linked to the WiFi network.

3. The communication system of claim 1, wherein
    at least one of the antennas is a modal antenna.

4. A method of optimizing signal quality for a plurality of devices linked to a WiFi network, wherein the WiFi network comprises a plurality of access points, each access point including an antenna having a plurality of modes corresponding to a plurality of radiation patterns, respectively, or an antenna system including a plurality of antennas having a plurality of modes corresponding to a plurality of radiation patterns, respectively, the method implemented in a processor of each access point as a computer program comprising instructions for performing:
    first obtaining an estimated downlink channel quality indicator (EDL-CQI) for each device in a cell covered by a first mode of the antenna or the antenna system of each access point during a first time interval, wherein the EDL-CQI is a metric characterizing signal quality in an uplink between the device and the access point;
    second obtaining a cell quality indicator (CellQI) for the first mode based on the EDL-CQIs respectively obtained for the plurality of devices in the cell covered by the first mode, wherein the CellQI is a metric characterizing signal quality over the cell;
    examining, by using a modal cognitive diversity (MCD) algorithm, if a second mode has a predicted CellQI higher than a predicted CellQI of the first mode;
    switching the first mode to the second mode if the second mode has the predicted CellQI higher than the predicted CellQI of the first mode, or keeping the first mode, otherwise; and
    repeating the first obtaining, the second obtaining, the examining and the switching or the keeping for sequential time intervals.

5. The method of claim 4, wherein
a device having a weak signal from the access point switches the link to another access point, and vice versa, after the switching or the keeping.

6. The method of claim 4, wherein
the EDL-CQI is generated by taking into account properties associated with a link between the access point and the device, the properties including signal to noise ratio (SNR) that the access point detects in the uplink and the modulation scheme in the downlink.

7. The method of claim 4, wherein
the CellQI is generated by taking an average, a minimum or other quantity based on the EDL-CQIs respectively obtained for the plurality of devices in the cell.

8. A method of optimizing signal quality for a plurality of devices linked to a WiFi network, wherein the WiFi network comprises a plurality of access points, each access point including an antenna having a plurality of modes corresponding to a plurality of radiation patterns, respectively, or an antenna system including a plurality of antennas having a plurality of modes corresponding to a plurality of radiation patterns, respectively, the method implemented in a processor of each access point as a computer program comprising instructions for performing:
    first informing a second access point of a first mode of the antenna or the antenna system of a first access point;
    first obtaining an estimate downlink channel quality indicator associated with the second access point (EDL-CQI-2) for each device in a cell covered by a second mode of the antenna or the antenna system of the second access point while the antenna or the antenna system of the first access point is configured in the first mode, wherein the EDL-CQI-2 is a metric characterizing signal quality in an uplink between the device and the second access point;
    second obtaining a cell quality indicator associated with the second access point (CellQI-2) for the second mode based on the EDL-CQI-2's respectively obtained for the plurality of devices in the cell covered by the second mode, wherein the CellQI-2 is a metric characterizing signal quality over the cell covered by the second mode;
    first repeating the first obtaining and the second obtaining for all second modes of the antenna or the antenna system of the second access point to determine a selected second mode that provides a best CellQI-2;
    second informing the first access point of the selected second mode that provides the best CellQI-2;
    third obtaining an estimated downlink channel quality indicator associated with the first access point (EDL-CQI-1) for each device in a cell covered by the first mode of the antenna or the antenna system of the first access point while the antenna or the antenna system of the second access point is configured in the selected second mode that provides the best CellQI-2, wherein the EDL-CQI-1 is a metric characterizing signal quality in an uplink between the device and the first access point;
    fourth obtaining a cell quality indicator associated with the first access point (CellQI-1) for the first mode based on the EDL-CQI-1's respectively obtained for the plurality of devices in the cell covered by the first mode, wherein the CellQI-1 is a metric characterizing signal quality over the cell covered by the first mode; and
    second repeating the third obtaining and the fourth obtaining for all first modes of the modal antenna of the first access point to determine a selected first mode that provides a best CellQI-1 while having the selected second mode that provides the best CellQI-2.

9. The method of claim 8, wherein
a device having a weak signal from the first access point switches the link to the second access point, and vice versa, in a configuration wherein the antenna or the antenna system of the first access point is in the selected first mode and the antenna or the antenna system of the second access point is in the selected second mode.

10. The method of claim 8, further comprising:
resuming the first informing through the second repeating when a criteria is met to seek for another combination of modes that provides optimal signal quality for the plurality of devices in the WiFi network.

11. The method of claim 8, wherein
the EDL-CQI-1 is generated by taking into account properties associated with a link between the first access point and the device, the properties including signal to noise ratio (SNR) that the first access point detects in the uplink and the modulation scheme in the downlink; and
the EDL-CQI-2 is generated by taking into account properties associated with a link between the second access point and the device, the properties including signal to noise ratio (SNR) that the second access point detects in the uplink and the modulation scheme in the downlink.

12. The method of claim 8, wherein
the CellQI-1 is generated by taking an average, a minimum or other quantity based on the EDL-CQI-1's respectively obtained for the plurality of devices in the cell covered by the first mode of the antenna or the antenna system of the first access point; and
the CellQI-2 is generated by taking an average, a minimum or other quantity based on the EDL-CQI-2's respectively obtained for the plurality of devices in the cell covered by the second mode of the antenna or the antenna system of the second access point.

\* \* \* \* \*